United States Patent
Otsuka et al.

(10) Patent No.: US 7,982,806 B2
(45) Date of Patent: Jul. 19, 2011

(54) BROADCAST RECEIVER

(75) Inventors: Isao Otsuka, Tokyo (JP); Hidetsugu Suginohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1260 days.

(21) Appl. No.: 11/633,551

(22) Filed: Dec. 5, 2006

(65) Prior Publication Data

US 2007/0216807 A1 Sep. 20, 2007

(30) Foreign Application Priority Data

Mar. 17, 2006 (JP) ................................ 2006-073872

(51) Int. Cl.
*H04N 5/45* (2011.01)

(52) U.S. Cl. .................. 348/565; 348/706; 348/738

(58) Field of Classification Search .................. 348/738, 348/565, 722, 564, 562, 705–706, 485, 484, 348/725, 553–555, 731; 725/38, 41, 43, 725/44; H04N 5/45
See application file for complete search history.

(56) References Cited

U.S. PATENT DOCUMENTS

| 5,442,452 A * | 8/1995 | Ryu ................................. 386/97 |
| 5,602,598 A * | 2/1997 | Shintani ........................ 348/565 |
| 6,067,126 A * | 5/2000 | Alexander .................... 348/738 |
| 7,113,224 B2 | 9/2006 | Inoue et al. |
| 7,712,117 B1 * | 5/2010 | Mohr ............................. 725/41 |

FOREIGN PATENT DOCUMENTS

| JP | 5-199470 A | 8/1993 |
| JP | 7-75015 A | 3/1995 |
| JP | 2003-134415 A | 5/2003 |
| JP | 2003-219332 A | 7/2003 |
| JP | 2003-295972 A | 10/2003 |
| JP | 2004-363774 A | 12/2004 |
| JP | 2005-16305 A | 1/2005 |

* cited by examiner

*Primary Examiner* — Trang U Tran
(74) *Attorney, Agent, or Firm* — Birch, Stewart, Kolasch & Birch, LLP

(57) ABSTRACT

A broadcast receiver includes a first video signal selector which outputs a video signal of a main-picture; a second video signal selector which outputs a video signal of a sub-picture; a first audio signal selector which outputs an audio signal of the main-picture; a second audio signal selector which outputs an audio signal of the sub-picture; a first video processor which generates a third video signal from the video signals of the main-picture and/or sub-picture; a feature quantity generator which generates a feature quantity of the audio signal of the sub-picture in accordance with a result of comparison between data corresponding to the audio signal of the sub-picture and sound class model data created beforehand; a determination processor which determines a scene as a specified scene; and a controller which controls the whole components in accordance with the specified scene.

11 Claims, 10 Drawing Sheets

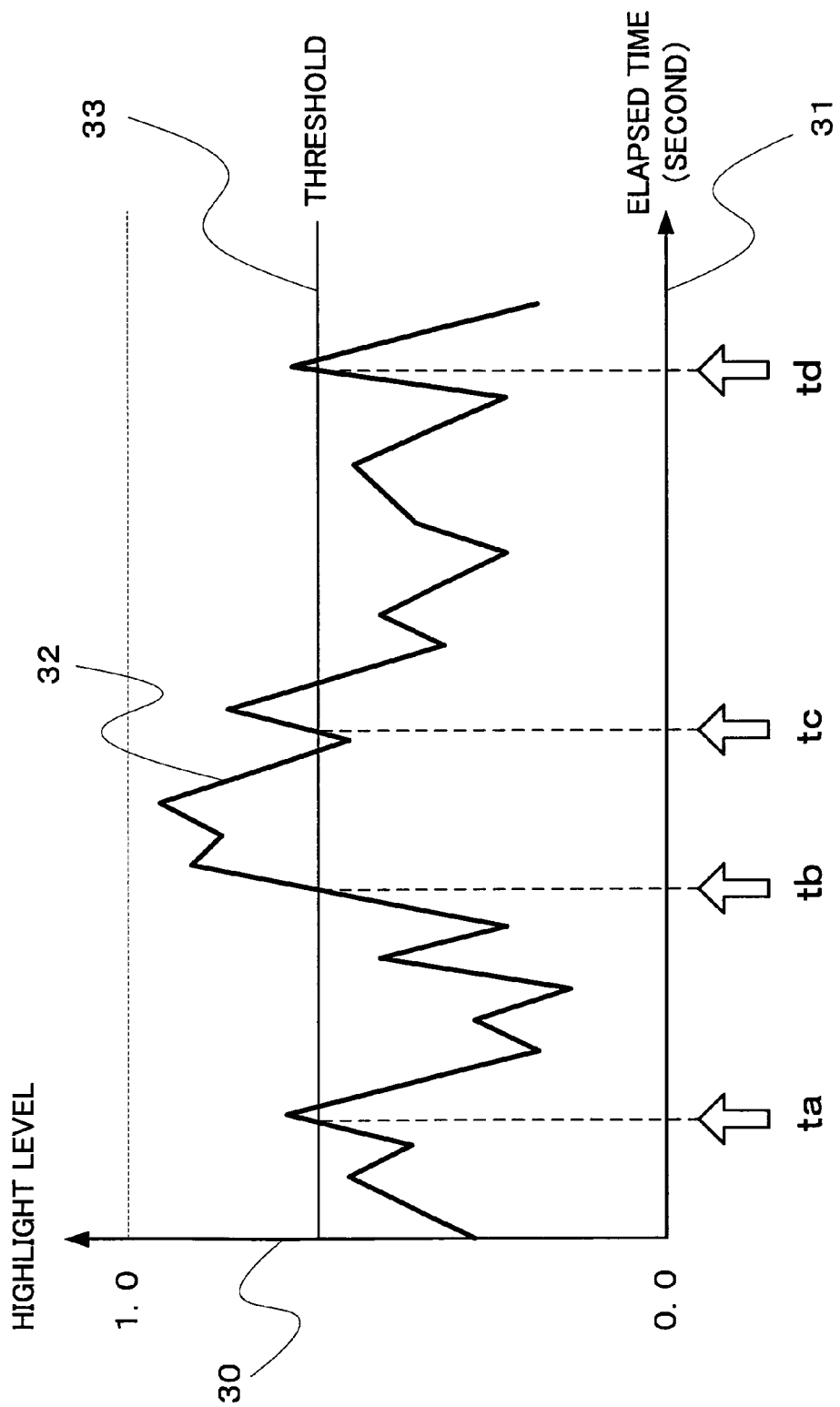

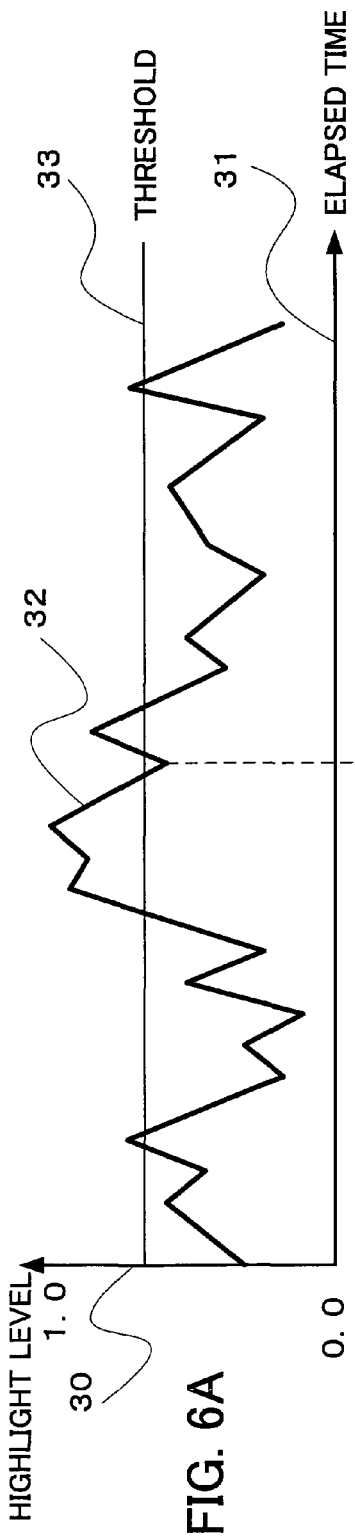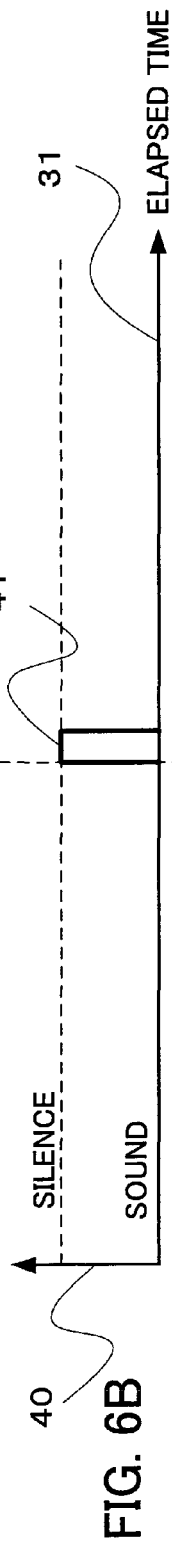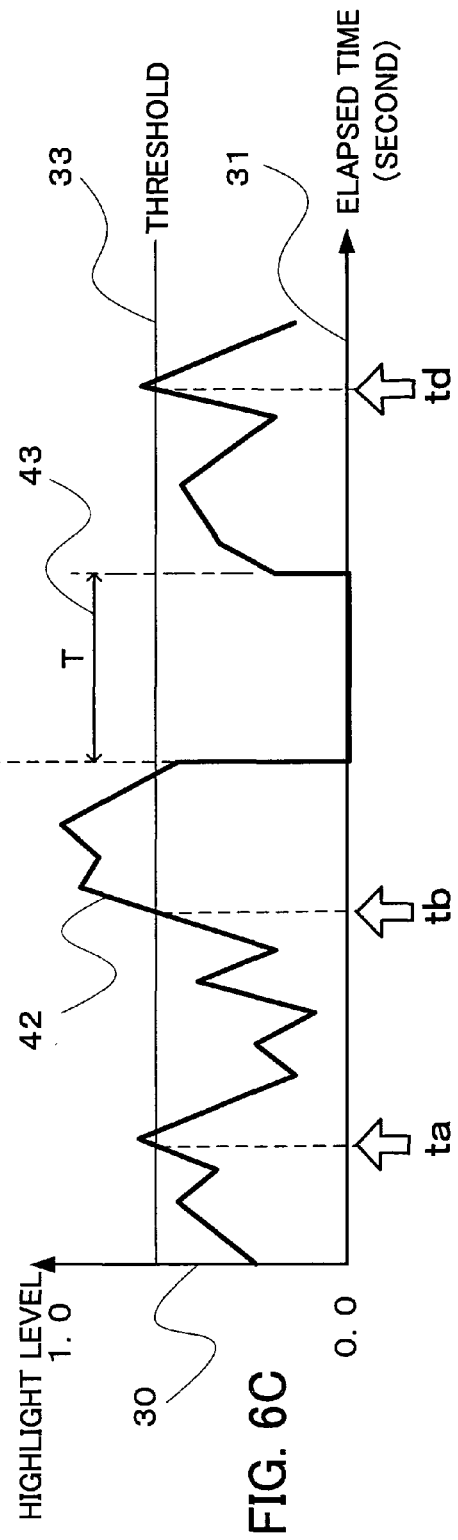

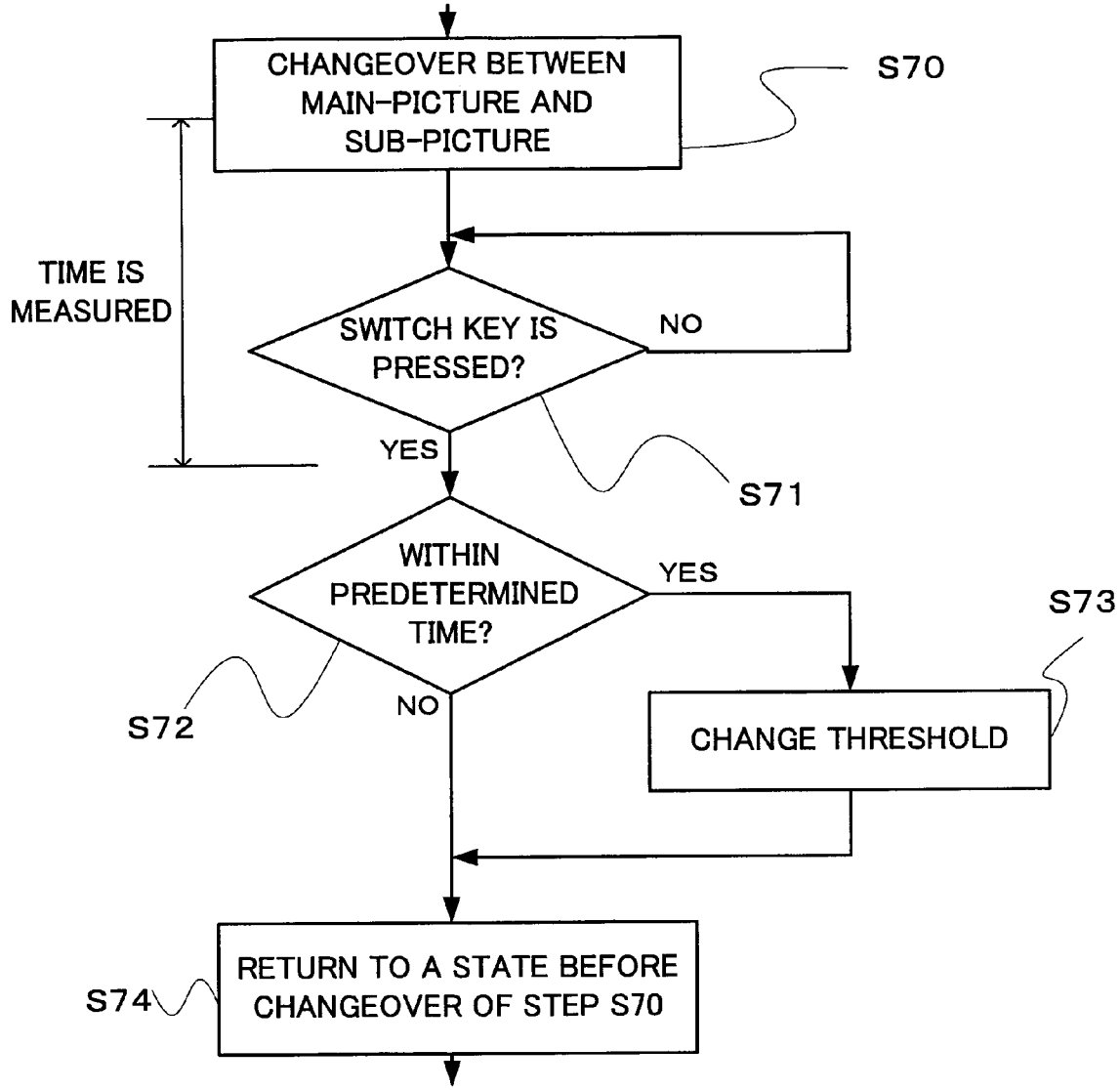

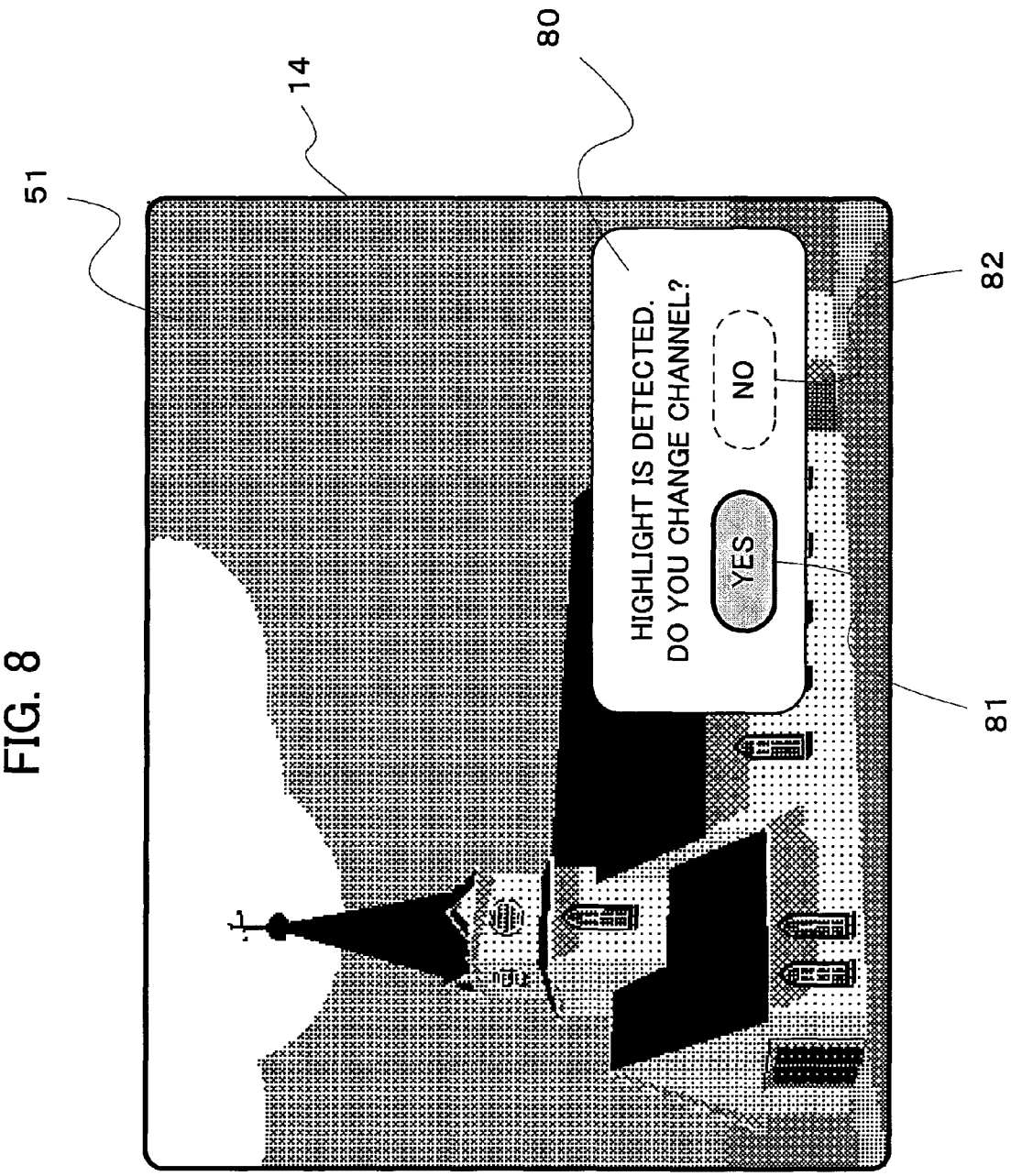

BROADCAST RECEIVER

BACKGROUND OF THE INVENTION

1. Field of the Invention

The present invention relates to a broadcast receiver such as a television receiver which receives a plurality of video/audio signals.

2. Description of the Related Art

Some television receivers have a picture-in-picture (PinP) function for displaying a main-picture (also referred to as a parent picture) and a sub-picture (also referred to as a child picture) simultaneously in a single image display screen. When the PinP function is used, the speaker usually outputs the sound of the main-picture and does not output the sound of the sub-picture. For example, the user (i.e., viewer) can view and enjoy a drama or a movie with sound in the main-picture while watching a program, the highlight scenes (such as a scoring scene) of which would be worthy of watching, such as a sports program, without sound output, and can switch between the main-picture and the sub-picture as necessary. With this type of use, however, the viewer must watch the main-picture while paying attention to the sub-picture without sound output and cannot devote himself or herself to enjoying the program shown in the main-picture. The viewer may miss a highlight scene broadcasted in the sub-picture when the viewer fails to notice the highlight scene.

There is one television receiver proposed to prevent this type of failure: The television receiver always monitors the audio output level of the sub-picture, determines that the scene is a highlight scene if the audio signal exceeds a predetermined level and if the audio signal exceeding the predetermined level continues for a predetermined period of time, records the video and sound of the determined highlight scene on a recording medium, and reproduces the program from the highlight detection time when the television viewer switches to the sub-picture. For example, refer to Japanese Patent Application Kokai (Laid-open) Publication No. 2003-134415 (Patent Document 1), page 6 and FIG. 1.

Further, there is another television receiver proposed with a function of monitoring the audio signal of a channel until the viewer changes the channel when a broadcast program is switched to a commercial break and returning the channel automatically to the channel selected before the change when the end of the commercial break is detected. For example, refer to Japanese Patent Application Kokai (Laid-open) Publication No. H5-199470 (Patent Document 2), page 5 and FIG. 5.

The television receiver of Patent Document 1 recognizes a highlight scene on the basis of the audio output level. It is, however, hard to specify an appropriate audio output threshold for recognizing a highlight scene, on the basis of the audio output level that depends largely on the broadcast station and program. A commercial break is often mistaken for a highlight scene because its audio output level is usually higher than that of an actual program.

Further, the television receiver of Patent Document 2 detects the end of a commercial break when the channel, in which the audio signal is monitored, is switched to a sound multiplex broadcast. The method to detect a commercial on the basis of the sound system can be applied only when the sound system of the actual program is a sound multiplex broadcast or a monaural broadcast and when the commercial is a stereo broadcast or a broadcast other than the sound multiplex broadcast.

Furthermore, in the television receiver of Patent Document 2, the system automatically switches the picture when it detects the end of a CM break. If the viewer does not want the automatic picture changeover, that is, if the viewer's interest has turned from the program before the change of the channel in which the end of a CM break has been monitored to the currently viewed program after the channel change, the viewer would find the automatic picture changeover embarrassing.

SUMMARY OF THE INVENTION

It is an object of the present invention to provide a broadcast receiver that can detect a specified scene of a television broadcast appropriately, independently of the sound system, and can make a notification or perform control in accordance with the appropriately detected scene.

According to the present invention, a broadcast receiver includes: a first video signal selector which receives a plurality of input video signals and outputs any of the plurality of input video signals as a video signal of a main-picture; a second video signal selector which receives the plurality of input video signals and outputs any of the plurality of video signals as a video signal of a sub-picture; a first audio signal selector which receives a plurality of input audio signals and outputs any of the plurality of input audio signals as an audio signal of the main-picture; and a second audio signal selector which receives the plurality of input audio signals and outputs any of the plurality of input audio signals as an audio signal of the sub-picture. Further, a broadcast receiver includes: a first video processor which generates a third video signal by using at least one of the video signal of the main-picture output from the first video signal selector and the video signal of the sub-picture output from the second video signal selector; a feature quantity generator which generates a feature quantity of the audio signal of the sub-picture output from the second audio signal selector in accordance with a result of comparison between data corresponding to the audio signal of the sub-picture and sound class model data created beforehand in accordance with collected known scenes; a determination processor which determines a scene as a specified scene when the feature quantity exceeds a predetermined threshold; and a controller which controls the first video signal selector, the second video signal selector, the first audio signal selector, the second audio signal selector, and the first video processor, in accordance with the specified scene detected by the determination processor.

According to the present invention, when the sound of the sub-picture is analyzed to detect a specified scene of a program, a feature quantity is generated on the basis of the result of comparison with sound class model data collected and created beforehand from already-known scenes, and a scene with a feature quantity exceeding a predetermined threshold is determined to be a specified scene, so that the specified scene can be appropriately detected, and an appropriate notification or control can be provided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a graph showing an example of a highlight level in the first embodiment;

FIGS. 6A to 6C are diagrams for describing the processing by the feature detector shown in FIG. 1;

FIG. 7 is a flow chart showing threshold change processing in a broadcast receiver according to the second embodiment of the present invention;

FIG. 8 is a view showing an example of the pictures displayed by a broadcast receiver according to the third embodiment of the present invention when a highlight scene is detected;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
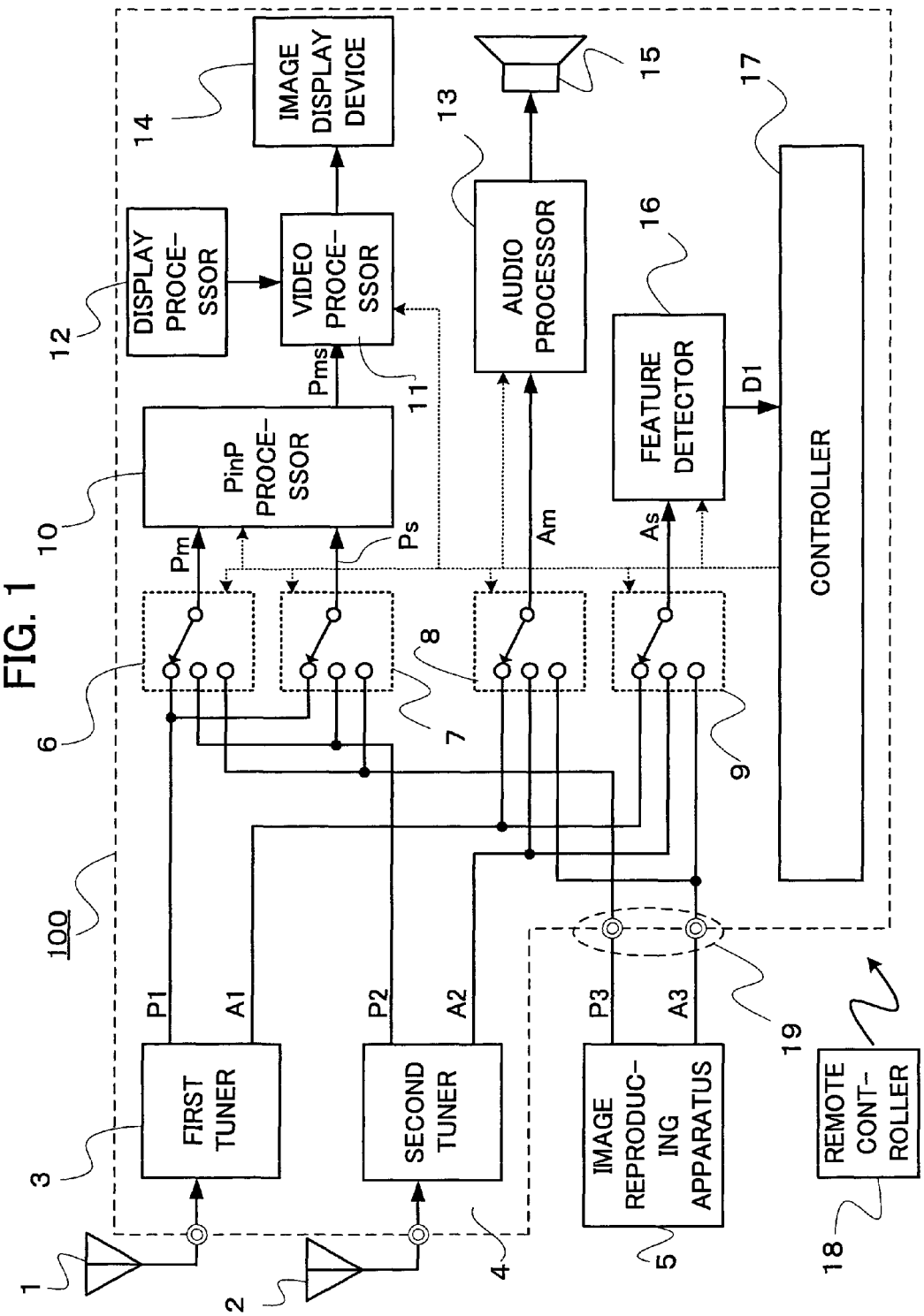
FIG. 1 is a block diagram showing a configuration of a broadcast receiver according to the first embodiment of the present invention.

FIG. 1 is a block diagram showing a configuration of a broadcast receiver such as a television receiver 100 according to the first embodiment of the present invention.

As shown in FIG. 1, the television receiver 100 includes a first tuner 3, to which a first antenna 1 is connected; and a second tuner 4, to which a second antenna 2 is connected. The television receiver 100 also includes a video signal selector 6 which receives video signals P1, P2 and P3, and selects one of them to output a video signal Pm of the main-picture; a video signal selector 7 which receives the video signals P1, P2 and P3, and selects one of them to output a video signal Ps of the sub-picture; an audio signal selector 8 which receives audio signals A1, A2 and A3, and selects one of them to output an audio signal Am of the main-picture, synchronized with the video signal Pm of the main-picture; and an audio signal selector 9 which receives the audio signals A1, A2 and A3, and selects one of them to output an audio signal As of the sub-picture, synchronized with the video signal Ps of the sub-picture. Further, the television receiver 100 includes a picture-in-picture (PinP) processor 10 which is a first video processor for receiving video signals Pm and Ps from the video signal selectors 6 and 7; a video processor 11 which is a second video processor for adding text information or the like to a video signal Pms; a display processor 12; and an image display device 14 such as a liquid crystal display panel. Furthermore, the television receiver 100 includes an audio processor 13; an audio output device 15 such as a speaker; a feature detector 16 which detects a specified scene from the audio signal of the sub-picture; and a controller 17 which controls the entire operation of the television receiver 100.

The television receiver 100 shown in FIG. 1 is a television set including the image display device 14 and the audio output device 15. However, the present invention can also be applied to an apparatus for outputting a video signal and an audio signal to an external monitor (not shown) and an external speaker (not shown), without the image display device 14 and/or the audio output device 15, for example, a broadcast receiver or a recording/reproducing apparatus with a built-in broadcast receiver.

The television receiver 100 shown in FIG. 1 includes the first tuner 3 and the second tuner 4. However, the present invention can also be applied to an apparatus for receiving a plurality of video/audio signals from an external receiving apparatus (not shown) for example, even without a tuner.

In the television receiver 100 shown in FIG. 1, the video signal selectors 6 and 7 and the audio signal selectors 8 and 9 receive three input signals each. However, the present invention can be applied to any other apparatus that can display a plurality of pictures based on two or more input video/audio signals simultaneously or in order.

The operation of the television receiver 100 of the first embodiment will next be described. In the television receiver 100, VHF, UHF and other signals received by the first antenna 1 and the second antenna 2 are supplied to the first tuner 3 and the second tuner 4 respectively. The first tuner 3 selects a broadcast signal of a desired channel and outputs NTSC-compliant color-television video signal P1 and audio signal A1, for example. The second tuner 4 selects a broadcast signal of a desired channel and outputs NTSC-compliant color-television video signal P2 and audio signal A2. As shown in FIG. 1, the video signal P3 and the audio signal A3 from an image reproducing apparatus 5, which is an externally connected apparatus such as a DVD player, may be input to the television receiver 100 through an external input terminal 19. The video signal P1 and audio signal A1 output from the first tuner 3, the video signal P2 and audio signal A2 output from the second tuner 4, and the video signal P3 and audio signal A3 input to the external input terminal 19 are input to the video signal selectors 6 and 7 and the audio signal selectors 8 and 9. The video signal selector 6 receives the video signals P1, P2 and P3, and selects one of them to output the video signal Pm of the main-picture. The video signal selector 7 receives the video signals P1, P2 and P3, and selects one of them to output the video signal Ps of the sub-picture. The audio signal selector 8 receives the audio signals A1, A2 and A3, and selects on of them to output the audio signal Am of the main-picture synchronized with the video signal Pm selected for the main-picture. The audio signal selector 9 receives the audio signals A1, A2 and A3, and selects one of them to output the audio signal As of the sub-picture synchronized with the video signal Ps selected for the sub-picture.

The video signal Pm of the main-picture output from the video signal selector 6 and the video signal Ps of the sub-picture output from the video signal selector 7 are input to the PinP processor 10. The PinP processor 10 combines the video signal Pm of the main-picture and the video signal Ps of the sub-picture and supplies a combined video signal Pms to the video processor 11. The combination processing includes the processing of generating the video signal Pms by replacing a part of the video signal Pm of the main-picture with the video signal Ps of the sub-picture, the processing of generating the video signal Pms only from the video signal Pm of the main-picture, the processing of generating the video signal Pms only from the video signal Ps of the sub-picture, and the like. The video processor 11 performs video signal processing to insert text and/or graphic information such as characters generated by the display processor 12 into the video signal Pms output from the PinP processor 10, on the screen. The video processor 11 amplifies and supplies the input video signal to the image display device 14. The image display device 14 displays a picture based on the input video signal.

The audio signal Am of the main-picture output from the audio signal selector 8 is supplied to the audio processor 13. The audio processor 13 adjusts the volume and quality of sound of the supplied audio signal Am and outputs the adjusted signal to the audio output device 15. The audio output device 15 outputs sound based on the input audio signal Am. The audio signal As of the sub-picture output from the audio signal selector 9 is input to the feature detector 16. The feature detector 16 detects a specified scene of the sub-picture in accordance with the input audio signal As of the sub-picture and outputs a detection signal D1 to the controller 17.

The controller 17 including a microprocessor and the like controls the whole of the television receiver 100 and has various kinds of functions. The viewer uses input keys (not shown) provided on the television receiver 100 or the remote controller 18 to give the controller 17 an instruction of an operation such as selecting a channel, switching between the main-picture and the sub-picture, adjusting the volume, and the like.

In the description given above, the first tuner 3 and the second tuner 4 are tuners for receiving a VHF/UHF signal of analog broadcasting. However, the first tuner 3 and/or the second tuner 4 can be a tuner for receiving digital broadcasting such as terrestrial digital broadcasting, BS digital broadcasting and CS digital broadcasting. If the first tuner 3 and/or the second tuner 4 is a tuner for receiving digital broadcasting, the first tuner 3 and/or the second tuner 4 has a function of separating MPEG-2 data and the like, which are coded video data overlaid as MPEG-TS (transport stream) received as a digital broadcast signal, and MPEG-2 Audio (AAC) data and the like, which are coded audio data, decode the data, and output an NTSC-compliant color-television video signal and an audio signal, for example. For example, one of the first tuner 3 and the second tuner 4 may be a tuner for analog broadcasting while the other is a tuner for digital broadcasting; both of the first tuner 3 and the second tuner 4 may also be tuners for digital broadcasting.

The image reproducing apparatus 5 connected to the external input terminal 19 can be any apparatus other than the DVD player, such as a video tape recorder, a hard disk recorder, recordable-DVD recorder, or a personal computer having a video reproduction function. The video signal P3 and the audio signal A3 output from the image reproducing apparatus 5 can be a video signal and an audio signal output from an analog broadcasting tuner or a digital broadcasting tuner included in the image reproducing apparatus 5, instead of the video/audio signal recorded on a recording medium such as a DVD or video tape.

Figure 2:
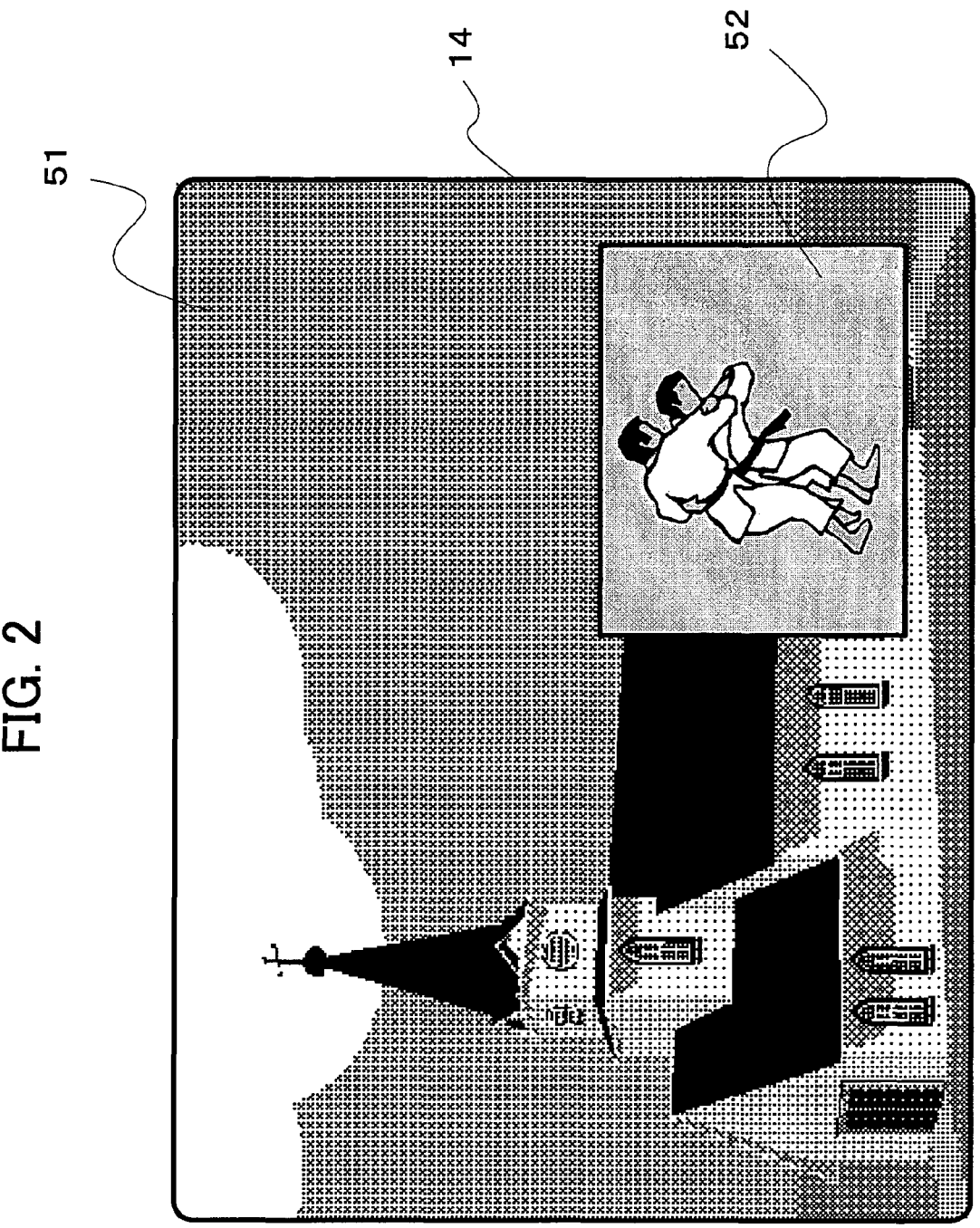
FIG. 2 is a view showing an example of the pictures displayed in the image display device shown in FIG. 1.

FIG. 2 is a view showing an example of the pictures displayed in the image display device shown in FIG. 1. As shown in FIG. 2, a picture based on the video signal Pm of the main-picture selected by the video signal selector 6 is displayed in the main-picture display area 51, and a picture based on the video signal Ps of the sub-picture selected by the video signal selector 7 is displayed in the sub-picture display area 52. The audio signal selector 8 selects the audio signal Am synchronized with the video signal Pm of the main-picture, and the sound based on the audio signal Am is output from the audio output device 15. FIG. 2 shows a general PinP screen showing the sub-picture display area 52 laid on a part of the main-picture display area 51. The position and size of the sub-picture 52 are not limited to those shown in the figure. For example, both the main-picture and the sub-picture can be tiled side by side or end to end on the display screen of the image display device 14. The controller 17 can also specify a display mode for displaying the main-picture display area 51 alone, not displaying the sub-picture display area 52, to the PinP processor 10.

Figure 3:
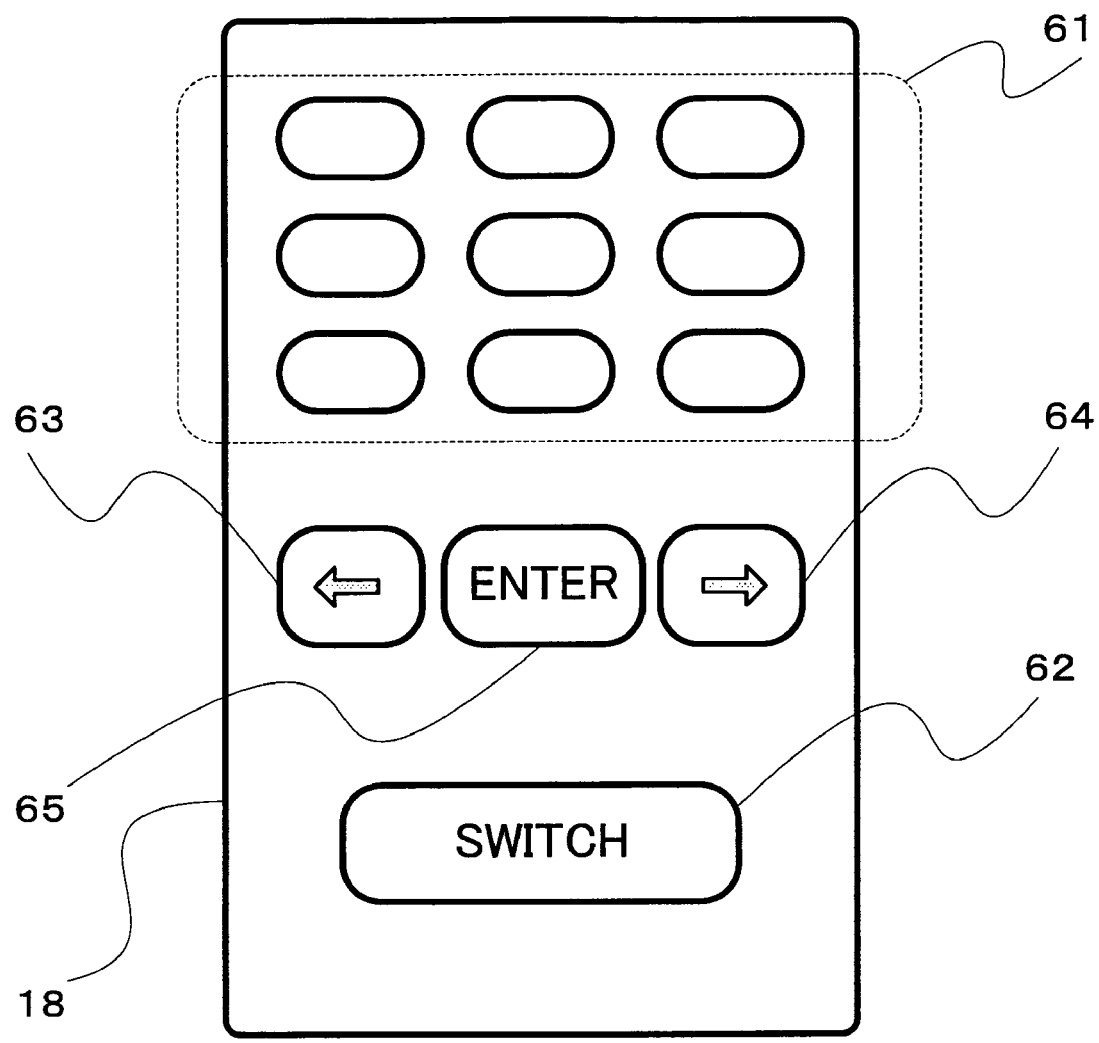
FIG. 3 is a diagram showing an example of the arrangement of operation keys on the remote controller shown in FIG. 1.

FIG. 3 is a view showing an example of the arrangement of operation keys on the remote controller 18 shown in FIG. 1. As shown in FIG. 3, the remote controller 18 includes function keys 61 for selecting a channel, adjusting the volume, and the like, a switch key 62 for switching between the main-picture and the sub-picture manually, a left direction key 63 and a right direction key 64 for specifying the left or right direction to be selected for an on-screen message or the menu screen, and an ENTER key 65 pressed to determine a selected item. When the switch key 62 is pressed, the video signal which had been selected by the video signal selector 6 of the main-picture is selected by the video signal selector 7 of the sub-picture, and the video signal which has been selected by the video signal selector 7 of the sub-picture is selected by the video signal selector 6 of the main-picture. With this video signal changeover, the audio signal selector 8 selects always the audio signal synchronized with the main-picture, and the audio signal selector 9 selects always the audio signal synchronized with the second audio channel.

Figure 4:
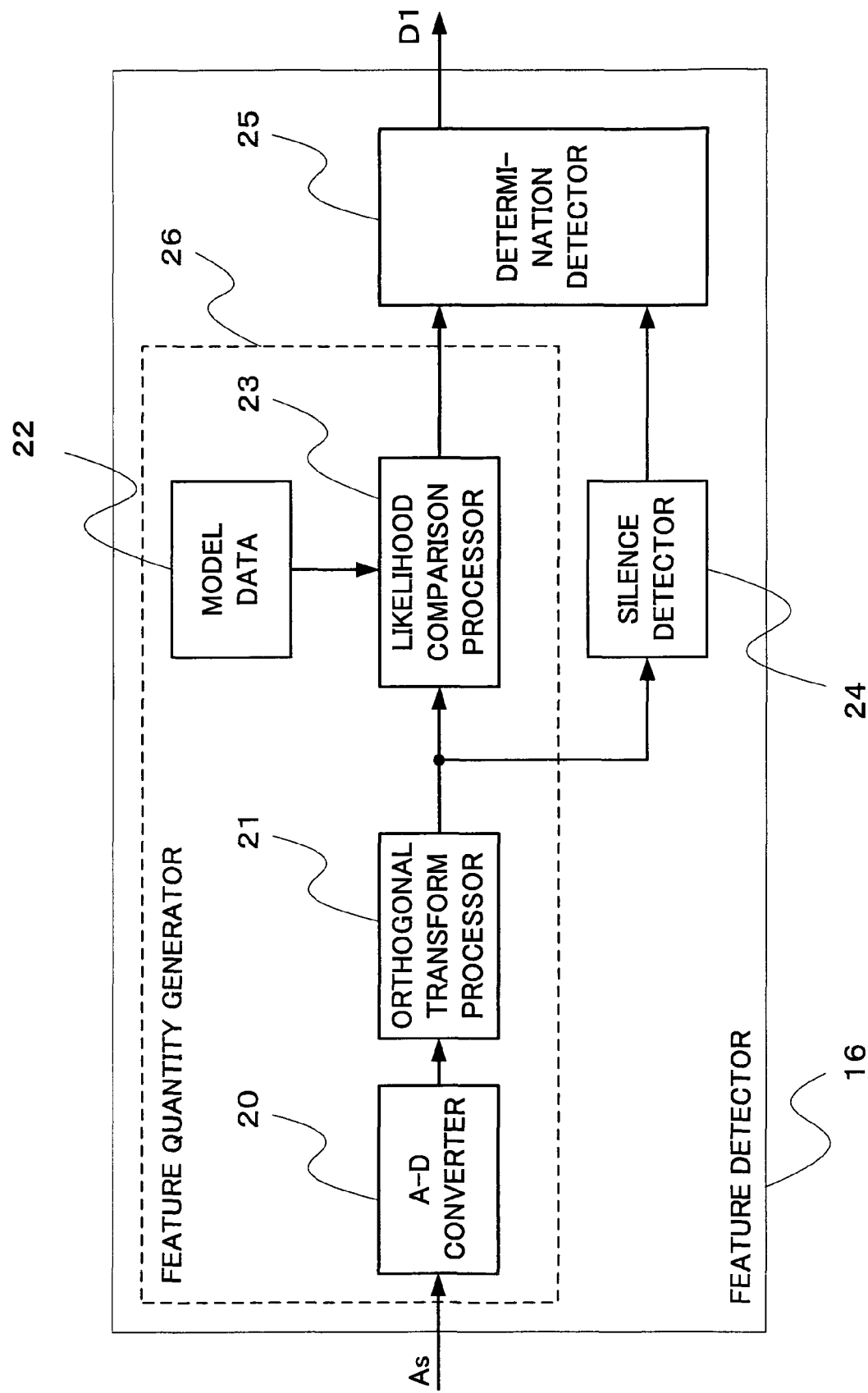
FIG. 4 is a functional block diagram showing a detailed configuration of the feature detector shown in FIG. 1.

FIG. 4 is a functional block diagram showing a detailed configuration of the feature detector 16 shown in FIG. 1. As shown in FIG. 4, the feature detector 16 includes an A-D (analog to digital) converter 20 for converting the analog audio signal As of the sub-picture to a PCM (pulse code modulation) digital signal; an orthogonal transform processor 21; a likelihood comparison processor 23; a model data storage (hereafter referred to as model data) 22, which is a storage device for storing a data table of sound class models referenced in an operation by the likelihood comparison processor 23; a silence detector 24 for detecting silence from the audio signal; and a determination processor 25 for determining a specified scene in accordance with label information calculated by the likelihood comparison processor 23 and the silence information detected by the silence detector 24. The A-D converter 20, the orthogonal transform processor 21, the model data 22, and the likelihood comparison processor 23 constitute a feature quantity generator 26 for generating a feature quantity of the audio signal As of the sub-picture output from the audio signal selector 9 in accordance with the result of comparison between the data corresponding to the audio signal As of the sub-picture and sound class models created from collected known scenes.

With reference to FIG. 4, the method of determining a specified scene by means of the feature detector 16 will be described in further detail. In the description, the specified scene detected by the determination processor 25 is a highlight scene such as a scoring scene in a sports program or a decisive opportunity (scoring chance). If the audio signal As of the sub-picture selected by the audio signal selector 9 of the second audio channel is a stereo signal, for example, the A-D converter 20 generates the PCM data of the right channel and the left channel. In the first embodiment, the sampling frequency can be 48 kHz, and the quantization bit rate can be 16 bits, as in the similar manner to the consumer recording equipment.

The orthogonal transform processor 21 performs an orthogonal transform of the PCM data from the time domain to the frequency domain. With respect to the orthogonal transform, a modified discrete cosine transform (MDCT) for transforming the PCM data with a 50% temporal overlap is used in the example described here. If 512 PCM data items are sampled to give a 50% overlap, 256 orthogonal transform coefficients (MDCT coefficients) are obtained for both the right channel and the left channel. A 256-dimension coefficient vector can be obtained from the orthogonal transform coefficient of either channel (left channel, for example) of the stereo signal or the single channel of the monaural signal. The number of dimension of the coefficient vector may be reduced by a projective transformation, in order to reduce the amount of computation.

Prior to the analysis of the input audio signal, a so-called highlight scene such as a scoring scene of a sports program or a decisive opportunity, in which an announcer shouts in a high-pitched voice or the spectators shout out loud, is determined by subjective evaluation, and coefficient vectors of orthogonal transforms calculated from the audio signals of those scenes are collected to form training data. A distribution tendency of coefficient vectors of each item of the collected training data is modeled by using the Gaussian Mixture Model (GMM). This type of model created from a highlight scene is referred to as a highlight class model. The voice of an announcer, the cheers, hand clapping, and laughter of spectators, music, and the like in normal times, not in a highlight scene, are collected from distinctive scenes determined by subjective evaluation, Gaussian Mixture Models are created from the collected training data, and a plurality of sound class models are prepared. The model data 22 become a data table with which the plurality of sound class models can be referenced.

The likelihood comparison processor 23 references the model data 22, searches for a sound class model which has the highest likelihood in a vector space of the orthogonal transform coefficient vector of an audio signal recorded at intervals of one audio frame (32 milliseconds), for example, assigns the sound class as the label of the period, and gives the information to the determination processor 25. Accordingly, when the input sound has a high likelihood with the frequency characteristics of a highlight class model, a label of a highlight scene is assigned, and the period can be presumed to be a highlight scene. The method of recognizing the sound class of the input signal with reference to models prepared beforehand does not need to compare the likelihood in accordance with the Gaussian Mixture Model and may use a statistical method such as the Hidden Marcov Model (HMM) method.

The silence detector 24 calculates the sum of squares of the values of 256 orthogonal transform coefficients (MDCT coefficients) obtained by the orthogonal transform processor 21 at intervals of one audio frame (32 milliseconds), for example, as audio energy in the period. If the audio energy obtained here is lower than a predetermined threshold and if this state continues for a predetermined period of time (500 milliseconds, for example) or longer, the state is determined to be silence, and the detection of silence is reported to the determination processor 25. Silence here means a silent part on a boundary when a main program such as a sports program is switched to a commercial, a boundary between commercials, or a boundary when a commercial is switched to a main program.

In the description given above, the specified scene detected by the feature detector 16 is a highlight scene of a sports program. Music and/or songs can also be detected as a specified scene by specifying music and/or songs as models in the model data 22. If the model data 22 for identifying laughter and the like is created, a scene in which laughter is heard can also be detected as a specified scene. The feature detector 16 detects a desired specified scene if the distinctive model data 22 for the desired scene are provided in advance.

In the description given above, silence is detected by the silence detector 24 in accordance with the audio energy, but another silence detection method can be used. For example, a means for detecting silence from the amplitude of the analog audio signal without intervention of the A-D converter 20 can be provided. A comparator may be used to separate input signals to silence and sound after a comparison with a predetermined reference level used as a threshold, and the microprocessor such as the controller 17 may monitor the binary output of the comparator and detect silence in accordance with the monitored binary output.

The determination processor 25 receives label information of a sound class at intervals of one audio frame (32 milliseconds), for example, obtained from the likelihood comparison processor 23 and a signal reporting silence detected by the silence detector 24. The determination processor 25 converts the degree of excitement of a sports program, for example, into numbers by arranging the labels of sound classes evaluated in audio frames chronologically and calculating the occupation of the labels of highlight classes in a time window having a predetermined length (such as 5 seconds). This occupation is referred to as a highlight level (see FIG. 5 and FIG. 6A, which will be described later). If one audio frame is 32 milliseconds long, a five-second time window has about 156 labels. If all the labels are determined to be in highlight classes, the highlight level becomes "1.0". If 78 labels are in highlight classes, the highlight level becomes "0.5". Because the highlight class labels of highlight scenes last for a long time, a higher highlight level means a higher degree of excitement in the scene. When the time window for the sound class labels arranged chronologically is changed in a predetermined period such as one audio frame or one second, the highlight level of the audio signal selected by the audio signal selector 9 is calculated successively. The determination processor 25 corrects the calculated highlight level in accordance with the silence information.

FIG. 5 is a graph showing an example of a highlight level in the first embodiment of the present invention. In FIG. 5, the vertical axis is a highlight level axis 30, taking values from "0.0" to "1.0", and the horizontal axis is an elapsed-time axis 31 for the received television broadcast. FIG. 5 shows a graphic plot of the highlight level 32 calculated by the determination processor 25. A threshold 33 is specified to detect a highlight scene of a specified scene from the highlight level 32.

With reference to FIG. 5, the method of determining a highlight scene by the determination processor 25 will next be described. First, an example of not performing correction based on the silence information obtained from the silence detector 24 will be described. That is, in the determination method described next, the silence detector 24 may not be included in the feature detector 16.

In FIG. 5, a highlight scene is defined as a scene having a highlight level exceeding the threshold 33 specified for the highlight level 32. The determination processor 25 successively checks the highlight level 32 with reference to the threshold 33 and notifies the controller 17 that a highlight scene is detected. In the example shown in FIG. 5, the determination processor 25 reports the detection of a highlight scene to the controller 17 at times ta, tb, tc and td.

The structure may allow the threshold 33 used by the determination processor 25 to be changed to an arbitrary value by an operation of the viewer or control by the controller 17. The threshold 33 can be varied within the range of "0.0" to "1.0" given by the highlight level axis 30. If the threshold 33 is specified to a low value, a slight degree of excitement of an announcer or spectators resulting in a low highlight level 32 is determined to be a highlight scene. If the threshold 33 is specified to a high value, a high degree of excitement resulting in a high highlight level 32 is determined to be a highlight scene. The threshold 33 can be specified to an appropriate value depending on the preference of the viewer and the tendency of the program.

When a report of the detection of a highlight scene is given from the feature detector 16, the controller 17 reports the detection of the highlight scene to the viewer. One reporting method with the PinP function as shown in FIG. 2 will be described. The image display device 14 displays the picture of the main-picture selected by the video signal selector 6 in the main-picture display area 51 and the picture of the sub-picture selected by the video signal selector 7 in the sub-picture display area 52. The audio signal selector 8 selects the audio signal synchronized with the video signal selected for the main-picture, and the signal is output from the audio output device 15. When the feature detector 16 detects a highlight scene from the audio signal selected by the audio signal selector 9 as a signal synchronized with the video signal selected for the sub-picture, the controller 17 controls the video signal selector 6, the video signal selector 7, the audio signal selector 8, and the audio signal selector 9 to switch automatically the video/audio signals of the main-picture and the sub-picture selected until just before the detection of the highlight scene. When a highlight scene is detected, the picture which had been selected for the sub-picture is displayed in the main-picture display area 51, and the sound accompanying the picture displayed in the main-picture display area 51 is output from the audio output device 15. The picture which had been selected for the main-picture is displayed in the sub-picture display area 52, and the sound accompanying the picture displayed in the sub-picture display area 52 is not output from the audio output device 15.

In the example shown in FIG. 2, the sub-picture display area 52 is laid on a part of the main-picture display area 51. However, these two display areas can be tiled side by side or end to end in the image display screen of the image display device 14. In this case, the main-picture display area 51 and the sub-picture display area 52 can be switched, and the sound based on the audio signal of the picture in which a highlight scene is detected can be output from the audio output device 15. Further, the main-picture display area 51 and the sub-picture display area 52 are not necessarily switched. The structure may switch the sound output from the audio output device 15 to the sound of a picture in which a highlight scene is detected, without switching the main-picture and the sub-picture.

When a display mode for displaying the main-picture display area 51 without displaying the sub-picture display area 52 is selected, the structure may switch the entire screen of the image display device 14 to the picture in which a highlight scene is detected and may output the sound accompanying the picture from the audio output device 15.

Further, in the description given above, a channel that had been selected for the main-picture until a specified scene is detected is switched to the sub-picture. The picture and sound of the sub-picture in which a highlight scene is detected should be output from the image display device 14 and the audio output device 15 as those of the main-picture. The picture of the main-picture before the detection of the highlight scene does not need to be specified in the sub-picture after the detection of the highlight scene. A method that can be used in that case is to store the channel that had been selected for the main-picture until a highlight scene is detected, in the memory (not shown) of the controller 17.

Furthermore, in the description given above, when a highlight scene is detected from the sound accompanying the picture selected for the sub-picture, the picture that had been displayed for the sub-picture is automatically switched to the picture of the main-picture in the main-picture display area 51, and the sound which had been output as the sound of the sub-picture is output from the audio output device 15, as the sound of the main-picture. After the changeover, the audio signal selector 9 of the sub-picture may not make a changeover, and the same audio signal as the sound that is selected by the audio signal selector 8 of the main-picture and output from the audio output device 15 may be input to the feature detector 16, so that the detection of a highlight scene is continued. In this operation, if a scene is not determined to be a highlight scene, that is if the highlight level 32 becomes lower than the threshold 33, the determination processor 25 sends a report of detection of a non-highlight scene to the controller 17, and the controller 17 automatically switches again the picture displayed in the main-picture display area 51 and the picture displayed in the sub-picture and controls the audio signal selector 8 to change the sound output from the audio output device 15 to the audio signal accompanying the switched picture, so that the states before the automatic changeover due to the detection of a highlight scene can be restored.

Moreover, in the description given above, the controller 17 performs the changeover of the main-picture and the sub-picture immediately after it receives a report of detection of a highlight scene from the feature detector 16. The structure may also allow a selection of an operation mode to execute a picture changeover after a fixed or variable delay from the report of the detection of a highlight scene or an operation mode to execute a picture changeover after the continuation of the highlight longer than or equal to a predetermined period is confirmed.

Further, in the operation mode described above, when a report of the detection of a non-highlight scene is given after the automatic changeover, the main-picture and the sub-picture are immediately returned to the states before the automatic changeover due to the detection of the highlight scene. The structure may also allow a selection of an operation mode to execute a picture changeover after a fixed or variable delay from the report of the detection of the non-highlight scene or an operation mode to execute a picture changeover after the continuation of the highlight scene longer than or equal to a predetermined period is confirmed.

Moreover, the threshold 33 specified for detecting a highlight scene by the determination processor 25 and the threshold for detecting a non-highlight scene after the automatic changeover between the main-picture and the sub-picture due to the detection of a highlight scene are not necessarily the same value. If the threshold specified for detecting a non-highlight scene can be specified to a lower level than the threshold 33 specified for detecting a highlight scene, for example, an unpleasant operation for the viewer can be suppressed, such as picture changeovers repeated at short intervals because of an automatic changeover immediately following another automatic changeover, when the duration of a highlight scene is short, for example.

FIGS. 6A to 6C are views showing the process steps of correction by the determination processor 25 shown in FIG. 4 in accordance with the silence information obtained from the silence detector 24. FIG. 6A shows a plot of the highlight level 32 before correction calculated by the determination processor 25, which is the same as that shown in FIG. 5. In FIG. 6B, the horizontal axis is the elapsed-time axis 31, and the vertical axis is a silence level axis 40. In FIG. 6B, a silence period, which is a period of time when a silence occurs, is indicated by a high level (1), and a sound period, which is a time of period when a sound exists, is indicated by a low level (0). FIG. 6B shows a silence level 41, for example, for indicating the silence period detected by the silence detector 24. FIG. 6C shows a highlight level 42 obtained after the highlight level 32 is corrected in accordance with the invalid period 43 on the basis of the silence level 41. Except for the above described respects, the description about FIG. 5 is adopted to FIGS. 6A to 6C.

Next, the process steps of correction of the highlight level by the determination processor 25 in accordance with the silence information obtained from the silence detector 24 will be described with reference to FIGS. 6A to 6C. For example, when a silence such as the silence level 41 is detected by the silence detector 24, correction is performed to replace the highlight level to a level such as "0.0", lower than the threshold 33 within the invalid period (T) 43 from the silence detection time. The duration of the invalid period 43 becomes valid for successive commercials when it is specified to 15 seconds or 30 seconds, which are the general duration of a commercial.

From the highlight level 42 corrected as described above, highlight scenes are detected at times ta, tb and td when the threshold 33 is exceeded, and the determination processor 25 reports the highlight scene detection to the controller 17.

In the correction processing description above, the highlight level is replaced to a fixed value such as "0.0" in the invalid period 43 after the silence detection time. The processing may multiply the highlight level by a coefficient such as "0.5" and may restore the original value of the highlight level in stages after the level is brought lower than the threshold 33 immediately after the detection of silence.

Further, in the above description of the first embodiment, the value of the highlight level is directly corrected. The determination processor 25 or the controller 17 may ignore a highlight scene detected in the invalid period 43 after the detection of silence.

As has been described above, the television receiver 100 according to the first embodiment determines a highlight level in accordance with the likelihood with the sound class model created from known highlight scenes collected beforehand when a highlight scene of a program is determined by analyzing the sound in the sub-picture of a television broadcast. Therefore, a highlight scene can be determined adequately.

Furthermore, when silence which is usually impossible in a highlight scene of a program is detected, the television receiver 100 according to the first embodiment supposes that there is a boundary between the program and a commercial, or that there is a commercial in the vicinity, and does not detect highlight scene in a predetermined period specified with reference to the silence detection time. Therefore, a commercial break will not be mistaken as a highlight scene.

Second Embodiment

FIG. 7 is a flow chart showing threshold change processing in a broadcast receiver such as a television receiver according to the second embodiment of the present invention. Steps S70 to S74 shown in FIG. 7 are performed by the controller 17. The television receiver according to the second embodiment is the same as the television receiver according to the first embodiment, except for the processing of the controller 17.

The threshold change processing by the controller 17 will be described in further detail with reference to FIG. 7. When a report of the detection of a highlight scene is received from the feature detector 16, the controller 17 automatically switches the pictures and sound of the main-picture and the sub-picture (step S70). The picture that had been selected for the sub-picture by the video signal selector 7 is selected by the video signal selector 6 and displayed as the main-picture by the image display device 14, and the audio signal accompanying the picture displayed in the main-picture is selected by the audio signal selector 8 and output from the audio output device 15. At the same time, the picture that had been selected for the main-picture by the video signal selector 6 is specified in the sub-picture by the video signal selector 7.

The viewer enjoying the picture and sound of the main-picture may not want the pictures and sound of the main-picture and the sub-picture to be switched in step S70. For example, when a drama or a movie on the channel specified in the main-picture reaches a climax, interest to the climax viewed in the main-picture may have precedence over a highlight scene detected in the sub-picture. Further, the reported highlight scene may not be a highlight scene for the viewer from a subjective point of view. In this case, the television viewer presses the switch key 62 of the remote controller 18 to return the automatically switched main-picture and sub-picture to the states selected by the video signal selectors 6 and 7 and the audio signal selectors 8 and 9 before the automatic changeover (step S74). The period between step S70 to the detection of user's operation of the switch key 62 (step S71) is measured. If the period is within a predetermined period such as five seconds (step S72), the subsequent highlight scene determination is performed using a raised threshold 33 specified for determining a highlight scene by the determination processor 25 (step S73).

Further, the controller 17 may be configured to return the threshold 33 changed in step S73 to the original value after a predetermined period such as five minutes.

In the first embodiment, when a non-highlight scene is detected after the automatic changeover between the main-picture and the sub-picture, the main-picture and the sub-picture are returned to the original states. If the viewer does not want the automatic return to the original states, the viewer presses the switch key 62 of the remote controller 18 to switch the main-picture and the sub-picture again. Accordingly, the period between the automatic return to the original states (corresponding to step S70) and the determination of the pressing of the switch key 62 (corresponding to step S71) is measured, and the subsequent determination of a non-highlight scene may be performed using a lowered threshold used to detect a non-highlight scene lowered (corresponding to step S73).

As has been described above, the television receiver according to the second embodiment can bring the threshold 33 specified for the detection of a highlight and/or the threshold specified for the detection of a non-highlight scene to a value suited to the preference of the viewer and can determine a highlight scene more appropriately.

Third Embodiment

In the first embodiment, when a report of the detection of a highlight scene is received from the feature detector 16, the controller 17 automatically switches the main-picture and the sub-picture without confirming the intention of the viewer. In the third embodiment, the occurrence of a highlight scene is just demonstrated to the viewer, and the changeover between the main-picture and the sub-picture is executed only when the viewer specifies the operation.

FIG. 8 is a view showing a displayed screen 14 of a broadcast receiver such as a television receiver according to the third embodiment of the present invention. As shown in FIG. 8, a message window 80, which indicates graphic data generated by the display processor 12, is displayed in the main-picture display area 51. The message window 80 includes selection buttons 81 and 82 that can be selected by the viewer using the remote controller or the like.

A method of reporting the occurrence of a highlight scene and the operation by the viewer will next be described with reference to FIG. 8. When the detection of a highlight scene is reported by the feature detector 16, the controller 17 displays the message window 80 on the display screen of the image display device 14. The message window 80 indicates that a highlight scene has been detected on the channel selected for the sub-picture and also displays a message confirming whether to switch the channel of the sub-picture to the main-picture. The selection button 81 for giving the consent to the message and the selection button 82 for giving a rejection are displayed, and the viewer uses the left direction key 63 or the right direction key 64 of the remote controller 18, for example, to select the selection button 81 or 82, and presses the ENTER key 65 to determine the channel to be output as the main-picture. In the example shown in FIG. 8, when the selection button (YES) 81 is selected and then the ENTER key 65 is pressed, the main-picture and the sub-picture are switched. When the selection button (NO) 82 is selected and then the ENTER key 65 is pressed, the main-picture and the sub-picture are not switched.

In the above description, the message window 80 includes selection buttons 81 and 82 so that the channel can be determined by pressing the ENTER key 65 after making a selection by using the left direction key 63 or the right direction key 64 of the remote controller 18. However, the message window 80 may just display text telling that a highlight scene has been detected and may have no selection buttons. In that case, the viewer recognizes the message window 80 and selects a desired channel as the main-picture by an operation such as pressing the switch key 62 of the remote controller 18.

FIG. 8 shows an example not having the sub-picture display area 52, but the sub-picture display area 52 may be provided as shown in FIG. 2. Further, if the sub-picture display area 52 is not provided, the sub-picture display area 52 may be output instead of the message window 80 to notify the viewer that a highlight scene has been detected.

As has been described above, when a highlight scene is detected in the sub-picture, the television receiver according to the third embodiment does not switch the main-picture and the sub-picture until the viewer specifies the operation. Accordingly, the viewer can continue enjoying the main-picture without interruption if the viewer does not want to switch to sub-picture.

Except for the above described respects, the third embodiment is the same as any of the first and second embodiments.

Fourth Embodiment

Figure 9:
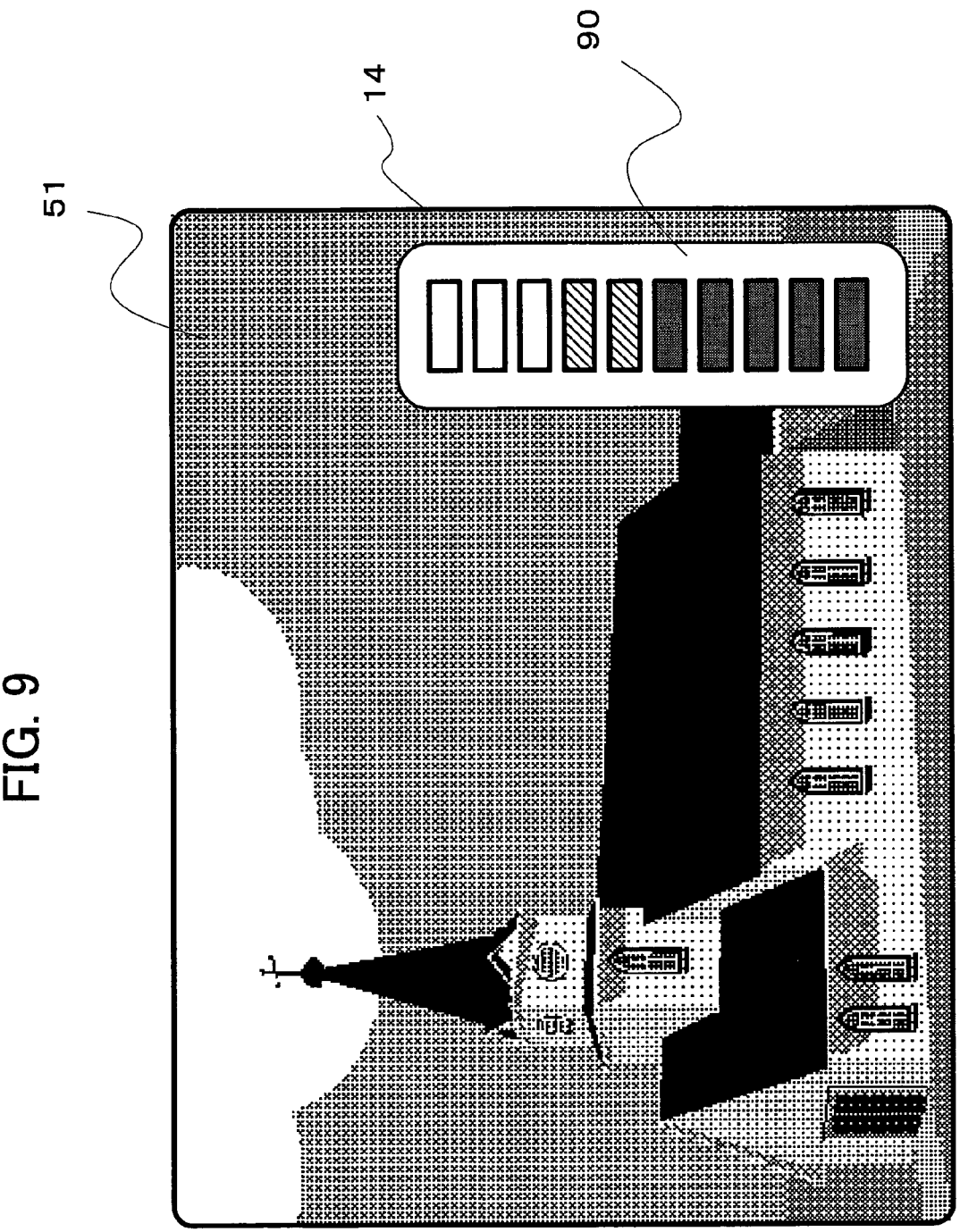
FIG. 9 is a view showing an example of the pictures displayed by a broadcast receiver according to the fourth embodiment of the present invention.

FIG. 9 is a view showing a displayed screen of a broadcast receiver such as a television receiver according to the fourth embodiment of the present invention. As shown in FIG. 9, an indicator 90, which indicates graphic data generated by the display processor 12, is displayed, for example, on a right side of the main-picture display area 51.

A method of reporting the occurrence of a highlight scene and the operation by the viewer will be described with reference to FIG. 9. The indicator 90 is successively updated in accordance with the highlight level calculated by the determination processor 25. The indicator 90 has ten rectangles while the highlight level varies from "0.0" to "1.0". When the highlight level is "0.5", the indicator 90 illuminates five rectangles of the indicator 90 from the bottom. Therefore, the viewer can visually recognize the highlight level of the sub-picture.

When the viewer knows a high highlight level of the sub-picture by means of the indicator 90 while watching the main-picture, the viewer can make an operation such as pressing the switch key 62 of the remote controller 18 to display the broadcasting of the sub-picture in the main-picture display area 51.

Further, the television receiver according to the fourth embodiment may have a function of switching the main-picture and the sub-picture automatically when the indicator 90 indicates that the highlight level is equal to or more than a predetermined level.

Furthermore, the example shown in FIG. 9 does not have the sub-picture display area 52, but the sub-picture display area 52 may be provided as shown in FIG. 2. The highlight level is reported by illuminating rectangles of the indicator 90, but the color tone or brightness of a part of the sub-picture display area 52 or a bounding rectangle (a frame portion) of the sub-picture display area 52 may be varied instead in stages depending the highlight level.

As has been described above, the television receiver according to the fourth embodiment allows the viewer to visually recognize the degree of excitement of the channel selected for the sub-picture while watching the main-picture. Therefore, the viewer can switch to the sub-picture as desired, depending on the degree of excitement of the channel selected for the sub-picture.

Except for the above described respects, the fourth embodiment is the same as any of the first to third embodiments.

Fifth Embodiment

Figure 10:
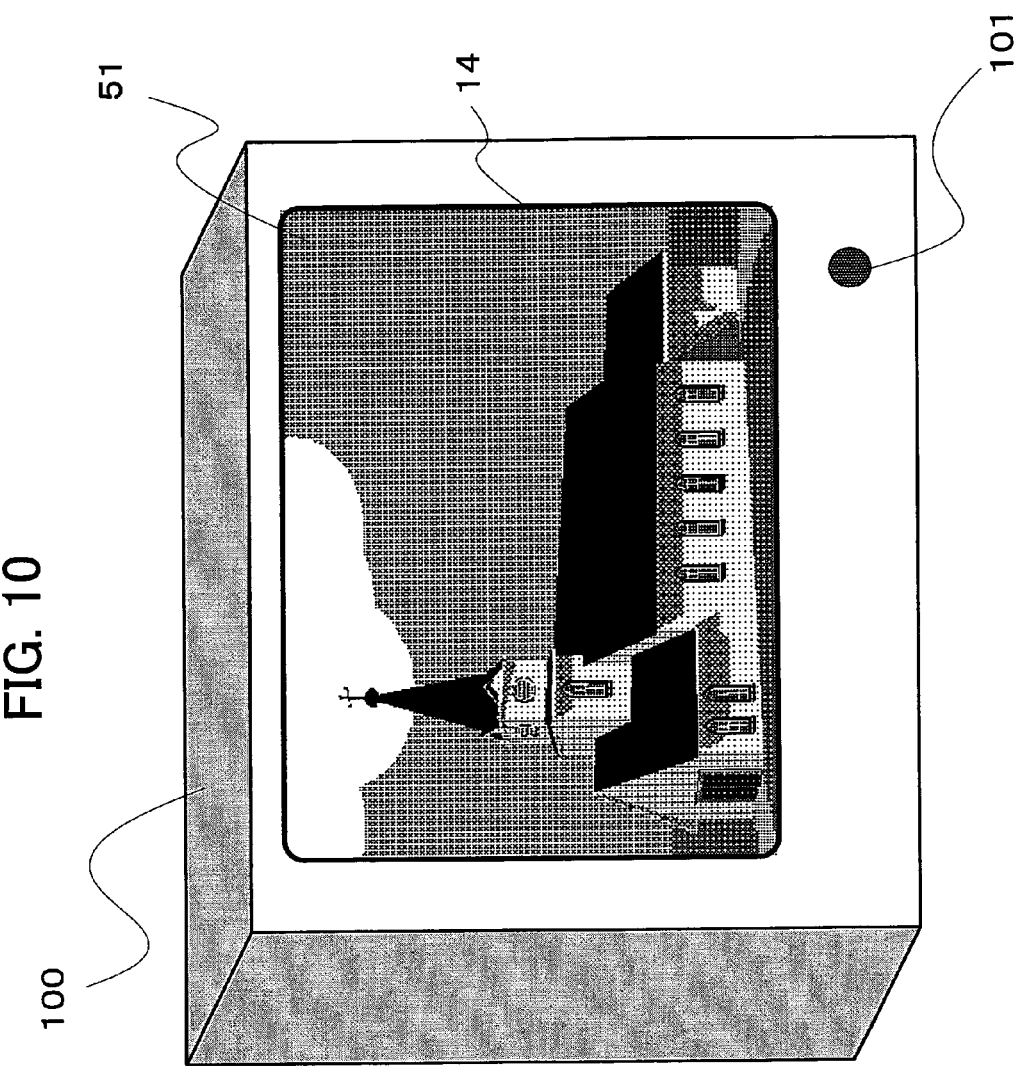
FIG. 10 is an external view of a broadcast receiver according to the fifth embodiment of the present invention.

FIG. 10 is an external view showing a broadcast receiver such as a television receiver 100 according to the fifth embodiment of the present invention. As shown in FIG. 10, the television receiver 100 includes an image display device 14 having a main-picture display area 51 and a notification device 101 such as an LED, for notifying the viewer that a highlight scene has been detected in the sub-picture.

A method of reporting the occurrence of a highlight scene and an operation by the viewer will be described with reference to FIG. 10. When the detection of a highlight scene is reported from the feature detector 16, the controller 17 illuminates the LED of the notification device 101 to notify the viewer that a highlight scene has been detected.

When the viewer is notified by the notification device 101 that a highlight scene has been detected in the sub-picture while watching the main-picture, the viewer makes an operation such as pressing the switch key 62 of the remote controller 18 to select a desired channel for the main-picture.

The example described above in the fifth embodiment does not have the sub-picture display area 52, but the sub-picture display area 52 may be provided as shown in FIG. 2. Further, the notification device 101 for notifying that a highlight scene has been detected may not be an LED and may be a visual notification device such as a liquid crystal display panel or a vacuum fluorescent display or an audible notification device having a sound source for generating a beep or an alert.

Moreover, the example described above in the fifth embodiment uses a single LED as the notification device 101 for notifying that a highlight scene has been detected, but ten LEDs may be provided to implement a function equivalent to the indicator 90 output as graphic data in the fourth embodiment, by changing the number of the illuminating LEDs in accordance with the current degree of highlight level.

As has been described above, the television receiver 100 according to the fifth embodiment has the notification device such as an LED on its main body, so that a notification screen by graphic data or the like is not laid on the main-picture. Accordingly, the viewer can note that a highlight scene has been detected in the channel selected for the sub-picture while being deeply intent on watching the main-picture.

Except for the above described respects, the fifth embodiment is the same as any of the first to fourth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A broadcast receiver comprising:
a first video signal selector which receives a plurality of input video signals and outputs any of the plurality of input video signals as a video signal of a main-picture;
a second video signal selector which receives the plurality of input video signals and outputs any of the plurality of video signals as a video signal of a sub-picture;
a first audio signal selector which receives a plurality of input audio signals and outputs any of the plurality of input audio signals as an audio signal of the main-picture;
a second audio signal selector which receives the plurality of input audio signals and outputs any of the plurality of input audio signals as an audio signal of the sub-picture;
a first video processor which generates a third video signal by using at least one of the video signal of the main-picture output from the first video signal selector and the video signal of the sub-picture output from the second video signal selector;
a feature quantity generator which generates a feature quantity of the audio signal of the sub-picture output from the second audio signal selector in accordance with a result of comparison between data corresponding to the audio signal of the sub-picture and sound class model data created beforehand in accordance with collected known scenes;
a determination processor which determines a scene as a specified scene when the feature quantity exceeds a predetermined threshold; and
a controller which controls the first video signal selector, the second video signal selector, the first audio signal selector, the second audio signal selector, and the first video processor, in accordance with the specified scene detected by the determination processor,
wherein the controller controls the first video signal selector and the second video signal selector so that the main-picture and the sub-picture are automatically switched when the specified scene is detected; and
if a user determines that the specified scene does not satisfy a predetermined condition, a canceller restores states before an automatic changeover of the main-picture and the sub-picture as requested by an operation of the user after the main-picture and the sub-picture are automatically switched.

2. The broadcast receiver according to claim 1, further comprising:
a silence detector which detects a silence period from the audio signal of the sub-picture;
the determination processor detecting a scene having the feature quantity exceeding the predetermined threshold during a predetermined period after a start time of the silence period detected by the silence detector except an invalid period, as the specified scene.

3. The broadcast receiver according to claim 1, further comprising:
a video display device which displays a picture based on the third video signal generated by the first video processor; and
an audio output device which outputs sound based on the audio signal of the main-picture output from the first audio signal selector.

4. The broadcast receiver according to claim 1, further comprising:
a second video processor which generates a fourth video signal for displaying other video data on the video signal generated by the first video processor.

5. The broadcast receiver according to claim 4, wherein the second video processor outputs a signal for displaying a question asking whether to switch the main-picture and the sub-picture, in combination with the video signal output from the first video processor when the specified scene is detected.

6. The broadcast receiver according to claim 4, wherein the second video processor outputs a signal for displaying a value varied with increase or decrease in the feature quantity, in combination with the video signal output from the first video processor.

7. The broadcast receiver according to claim 1, further comprising:
a notification device which notifies a viewer that the specified scene has been detected.

8. The broadcast receiver according to claim 1, wherein the controller controls the first video signal selector and the second video signal selector to switch the main-picture and the sub-picture after an instruction is given by an operation of the user when the specified scene is detected.

9. The broadcast receiver according to claim 1,
wherein the controller changes the predetermined threshold used by the determination processor in accordance with a period from when the main-picture and the sub-picture are switched by the automatic changeover until the canceller restores the states before the automatic changeover between the main-picture and the sub-picture.

10. The broadcast receiver according to claim 9, wherein the controller returns the changed threshold to the level before the change after a lapse of a predetermined time.

11. A broadcast receiver comprising:
a first video signal selector which receives a plurality of input video signals and outputs any of the plurality of input video signals as a video signal of a main-picture;
a second video signal selector which receives the plurality of input video signals and outputs any of the plurality of video signals as a video signal of a sub-picture;
a first audio signal selector which receives a plurality of input audio signals and outputs any of the plurality of input audio signals as an audio signal of the main picture,
a second audio signal selector which receives the plurality of input audio signals and outputs any of the plurality of input audio signals as an audio signal of the sub-picture;
a first video processor which generates a third video signal by using at least one of the video signal of the main-picture output from the first video signal selector and the video signal of the sub-picture output from the second video signal selector;
a feature quantity generator which generates a feature quantity of the audio signal of the sub-picture output from the second audio signal selector in accordance with a result of comparison between data corresponding to the audio signal of the sub-picture and sound class model data created beforehand in accordance with collected known scenes;
a determination processor which determines a scene as a specified scene when the feature quantity exceeds a predetermined threshold; and
a controller which controls the first video signal selector, the second video signal selector, the first audio signal selector, the second audio signal selector, and the first video processor, in accordance with the specified scene detected by the determination processor,
wherein the feature quantity generator includes:
an orthogonal transform processor which performs an orthogonal transform of the audio signal of the sub-picture in a time domain output to data of a frequency domain;

a model data storage which holds a known coefficient vector collected and modeled from scenes having a desired coefficient vector; and a likelihood comparison processor which monitors a coefficient value obtained from an orthogonal transform performed by the orthogonal transform processor and outputs a frequency of occurrence of a period having likelihood higher than a predetermined level with respect to the known coefficient vector held in the model data storage, as the feature quantity.

* * * * *